(12) United States Patent
Castleman et al.

(10) Patent No.: US 10,210,905 B2
(45) Date of Patent: Feb. 19, 2019

(54) REMOTE CONTROLLED OBJECT MACRO AND AUTOPILOT SYSTEM

(71) Applicant: SONY INTERACTIVE ENTERTAINMENT INC., Tokyo (JP)

(72) Inventors: Dennis Dale Castleman, Fremont, CA (US); Ruxin Chen, Redwood City, CA (US); Frank Zhao, San Mateo, CA (US); Glenn Black, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/394,391

(22) Filed: Dec. 29, 2016

(65) Prior Publication Data

US 2018/0095463 A1  Apr. 5, 2018

Related U.S. Application Data

(60) Provisional application No. 62/402,737, filed on Sep. 30, 2016.

(51) Int. Cl.
| | | |
|---|---|---|
| *G01C 23/00* | (2006.01) | |
| *G11B 27/10* | (2006.01) | |
| *B64C 39/02* | (2006.01) | |
| *G05D 1/00* | (2006.01) | |
| *G06F 3/0484* | (2013.01) | |

(52) U.S. Cl.
CPC .......... *G11B 27/102* (2013.01); *B64C 39/024* (2013.01); *G05D 1/0022* (2013.01); *B64C 2201/127* (2013.01); *B64C 2201/141* (2013.01); *B64C 2201/146* (2013.01); *G06F 3/04847* (2013.01)

(58) Field of Classification Search
CPC .. G05D 1/0088; B64C 39/024; G08G 5/0034; G11B 27/102; G11B 31/006; G06F 3/04847
USPC ........................................... 701/3, 7, 16, 400
See application file for complete search history.

(56) References Cited

U.S. PATENT DOCUMENTS

| | | |
|---|---|---|
| 3,279,863 A | 10/1966 | Zuppiger |
| 3,367,658 A | 2/1968 | Bayha |
| 6,021,646 A | 2/2000 | Burley et al. |

(Continued)

FOREIGN PATENT DOCUMENTS

WO   WO 2018/063594   4/2018

OTHER PUBLICATIONS

U.S. Appl. No. 15/394,473, Dennis Castleman, UAV Battery Form Factor and Insertion/Ejection Methodologies, filed Dec. 29, 2016.

(Continued)

*Primary Examiner* — Shardul D Patel
(74) *Attorney, Agent, or Firm* — Polsinelli LLP

(57) ABSTRACT

A flight path management system manages flight paths for an unmanned aerial vehicle (UAV). The flight path management system receives a sequence of controller inputs for the UAV, and stores the sequence of controller inputs in a memory. The flight path management system accesses the memory and selects a selected section of the sequence of controller inputs corresponding to a time period. The flight management system outputs the selected section to a playback device in real time over a length of the time period.

20 Claims, 5 Drawing Sheets

(56) References Cited

U.S. PATENT DOCUMENTS

| | | | |
|---|---|---|---|
| 6,075,924 A | 6/2000 | Will | |
| 7,988,154 B1 | 8/2011 | Regan, Jr. | |
| 8,025,293 B1 | 9/2011 | Crawford et al. | |
| 8,909,391 B1* | 12/2014 | Peeters | G05D 1/0027 701/2 |
| 9,061,102 B2 | 6/2015 | Levien et al. | |
| 9,442,485 B1 | 9/2016 | McDermott et al. | |
| 9,605,926 B1 | 3/2017 | Means et al. | |
| 10,062,292 B2 | 8/2018 | Blomberg et al. | |
| 10,067,736 B2 | 9/2018 | Taylor | |
| 2003/0102016 A1 | 6/2003 | Bouchard | |
| 2003/0152892 A1 | 8/2003 | Huang et al. | |
| 2004/0115593 A1 | 6/2004 | Hatlestad et al. | |
| 2005/0004723 A1 | 1/2005 | Duggan et al. | |
| 2006/0095262 A1 | 5/2006 | Danielli | |
| 2006/0169508 A1 | 8/2006 | Trojahn | |
| 2007/0061116 A1 | 3/2007 | Bush | |
| 2007/0102876 A1 | 5/2007 | Giegerich et al. | |
| 2008/0073839 A1 | 3/2008 | Nally | |
| 2008/0093796 A1 | 4/2008 | Narus et al. | |
| 2008/0144884 A1 | 6/2008 | Habibi | |
| 2008/0154447 A1* | 6/2008 | Spinelli | G01C 21/20 701/7 |
| 2008/0221745 A1* | 9/2008 | Diamandis | A63K 3/00 701/3 |
| 2009/0005167 A1 | 1/2009 | Arrasvuori et al. | |
| 2009/0076665 A1 | 3/2009 | Hoisington et al. | |
| 2009/0087029 A1 | 4/2009 | Coleman et al. | |
| 2009/0118896 A1 | 5/2009 | Gustafsson | |
| 2009/0125163 A1 | 5/2009 | Duggan et al. | |
| 2009/0187389 A1* | 7/2009 | Dobbins | G06F 3/011 703/6 |
| 2010/0083038 A1* | 4/2010 | Pierce | G06F 11/1666 714/5.11 |
| 2010/0096491 A1* | 4/2010 | Whitelaw | A63K 3/00 244/15 |
| 2010/0121574 A1 | 5/2010 | Ariyur et al. | |
| 2010/0228468 A1 | 9/2010 | D'Angelo | |
| 2010/0305724 A1 | 12/2010 | Fry et al. | |
| 2011/0106339 A1 | 5/2011 | Phillips et al. | |
| 2011/0184590 A1 | 7/2011 | Duggan et al. | |
| 2012/0035799 A1 | 2/2012 | Ehrmann | |
| 2012/0188078 A1 | 7/2012 | Soles et al. | |
| 2012/0212399 A1 | 8/2012 | Border et al. | |
| 2013/0328927 A1 | 12/2013 | Mount et al. | |
| 2014/0324253 A1 | 10/2014 | Duggan et al. | |
| 2015/0063610 A1 | 3/2015 | Mossner | |
| 2015/0209659 A1 | 7/2015 | Barr et al. | |
| 2015/0323931 A1 | 11/2015 | Downey et al. | |
| 2015/0346722 A1* | 12/2015 | Herz | G05D 1/0038 701/2 |
| 2016/0035224 A1 | 2/2016 | Yang et al. | |
| 2016/0078759 A1 | 3/2016 | Nerayoff et al. | |
| 2016/0091894 A1 | 3/2016 | Zhang et al. | |
| 2016/0117931 A1 | 4/2016 | Chan et al. | |
| 2016/0205654 A1* | 7/2016 | Robinson, Jr. | H04W 4/029 455/456.3 |
| 2016/0217698 A1 | 7/2016 | Liu et al. | |
| 2016/0253908 A1 | 9/2016 | Chambers et al. | |
| 2016/0257001 A1 | 9/2016 | Blasdel et al. | |
| 2016/0291593 A1 | 10/2016 | Hammond et al. | |
| 2016/0299506 A1 | 10/2016 | Bruggeman et al. | |
| 2017/0039859 A1 | 2/2017 | Hu et al. | |
| 2017/0053169 A1 | 2/2017 | Cuban et al. | |
| 2017/0061813 A1* | 3/2017 | Tao | G09B 9/08 |
| 2017/0069214 A1 | 3/2017 | Dupray et al. | |
| 2017/0116723 A1 | 4/2017 | Aughey | |
| 2017/0158353 A1* | 6/2017 | Schmick | B64F 1/007 |
| 2017/0251323 A1 | 8/2017 | Jo et al. | |
| 2017/0295446 A1 | 10/2017 | Thagadur | |
| 2017/0372617 A1 | 12/2017 | Bruno et al. | |
| 2018/0039262 A1* | 2/2018 | Fox | G01S 19/51 |
| 2018/0046187 A1 | 2/2018 | Martirosyan et al. | |
| 2018/0046560 A1 | 2/2018 | Gillies et al. | |
| 2018/0093171 A1 | 4/2018 | Mallinson | |
| 2018/0093768 A1 | 4/2018 | Castleman | |
| 2018/0093781 A1 | 4/2018 | Mallinson | |
| 2018/0094931 A1 | 4/2018 | Taylor | |
| 2018/0095433 A1 | 4/2018 | Rico | |
| 2018/0095461 A1 | 4/2018 | Taylor | |
| 2018/0095714 A1 | 4/2018 | Taylor | |
| 2018/0096455 A1 | 4/2018 | Taylor | |
| 2018/0096611 A1 | 4/2018 | Kikuchi | |
| 2018/0098052 A1 | 4/2018 | Black | |

OTHER PUBLICATIONS

U.S. Appl. No. 15/394,313, Michael Taylor, Proximity Based Noise and Chat, filed Dec. 29, 2016.

PCT Application No. PCT/US2017/048064 International Search Report and Written Opinion dated Nov. 7, 2017.

U.S. Appl. No. 15/394,313 Office Action dated Oct. 18, 2017.

Williams, Elliot; "Real-life Space Invaders with Drones and Lasers," Hackaday, Sep. 19, 2016.

Fujii, Katsuya; Higuchi, Keita; Rekimoto, Jun; "Endless Flyer: A Continuous Flying Drone with Automatic Battery Replacement", 2013 IEEE 10th International Conference on Ubiquitous Intelligence & Computing and 2013 IEEE 10th International Conference on Autonomic & Trusted Computing, pp. 216-223.

U.S. Appl. No. 15/393,855 Office Action dated May 16, 2018.

U.S. Appl. No. 16/121,441, Michael Taylor, Proximity Based Noise and Chat, filed Sep. 4, 2018.

U.S. Appl. No. 15/394,329 Office Action dated Aug. 7, 2018.

U.S. Appl. No. 15/394,267 Office Action dated Aug. 24, 2018.

U.S. Appl. No. 15/394,285 Office Action dated Aug. 3, 2018.

U.S. Appl. No. 15/393,855 Final Office Action dated Oct. 12, 2018.

U.S. Appl. No. 15/711,695 Office Action dated Oct. 5, 2018.

U.S. Appl. No. 15/711,961 Office Action dated Oct. 5, 2018.

U.S. Appl. No. 15/711,695, Dominic S. Mallinson, Unmanned Aerial Vehicle Movement Via Environmental Airflow, filed Sep. 21, 2017.

U.S. Appl. No. 15/711,961, Dominic S. Mallinson, Unmanned Aerial Vehicle Movement Via Environmental Interactions, filed Sep. 21, 2017.

* cited by examiner

REMOTE CONTROLLED OBJECT MACRO AND AUTOPILOT SYSTEM

CROSS-REFERENCE TO RELATED APPLICATION

This application claims the benefit of U.S. Provisional Patent Application Ser. No. 62/402,737 entitled "REMOTE CONTROLLED OBJECT MACRO AND AUTOPILOT SYSTEM", filed Sep. 30, 2016. The aforementioned application is herein incorporated by reference in its entirety.

This application is related to U.S. Provisional Patent Application Ser. No. 62/402,752 entitled "STEERING ASSIST", filed Sep. 30, 2016, and U.S. Provisional Patent Application Ser. No. 62/402,747 entitled "COLLISION DETECTION AND AVOIDANCE", filed Sep. 30, 2016, all of which are incorporated herein by reference.

BACKGROUND OF THE INVENTION

Field of the Invention

This application relates to remote controlled piloting, and more particularly to a system and method for remote controlled piloting aids for unmanned aerial vehicles.

Description of the Related Art

An unmanned aerial vehicle (UAV), commonly known as a drone or quadricopter, or by several other names, is an aircraft without a human pilot aboard. The flight of UAVs may operate with various degrees of autonomy: either under remote control by a human operator, or fully or intermittently autonomously, by onboard computers.

Drones may be used for racing games or competition that consist in following a path that is defined like a slalom by single or double gates or posts, and by a finish line. In order to win the race, it is essential to go fast. And in order to save time, it is necessary to turn around the posts as closely as possible while conserving a maximum amount of kinetic energy, i.e. while traveling relatively fast. Outside of racing, drones can also perform advanced aerial maneuvers such as loops, split-s, Immelmann, barrel rolls, figure eights, etc.

With present drones, these maneuvers require the user to be skilled and experienced because the mode of piloting requires the user to use several different controls in combination in order to perform these maneuvers.

Offering recording and playback functionality may be particularly helpful with drone pilots and spectators for learning and for entertainment. As drone controller have become capable of executing more maneuvers, game controllers have incorporated more complex control options (e.g., multiple joysticks, Z-triggers, shoulder-triggers, motion tracking along X-, Y-, and Z-axes, and the like). The use of the various control options alone, in combination, and sometimes in particular sequences has increased the complexity of executing certain maneuvers. It may be helpful for some users to have increased knowledge of how a particular task or maneuver was executed with respect to the various control options on a controller device.

Additionally, users who are not controlling a drone may desire to watch a drone being controlled by others as a spectator, for example, as entertainment, for learning, or for social reasons.

SUMMARY OF THE PRESENTLY CLAIMED INVENTION

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In accordance with one or more aspects of the examples described herein, systems and methods are provided for managing flight paths for an unmanned aerial vehicle (UAV).

In an aspect, a flight path management system manages flight paths for an unmanned aerial vehicle (UAV). The flight path management system receives a sequence of controller inputs for the UAV, and stores the sequence of controller inputs in a memory. The flight path management system accesses the memory and selects a selected section of the sequence of controller inputs corresponding to a time period. The flight management system outputs the selected section to a playback device in real time over a length of the time period.

In a second aspect, a system for managing flight paths by an unmanned aerial vehicle (UAV) includes a recording device configured to receive a sequence of controller inputs for the UAV. The system includes a memory coupled to the recording device configured to store the sequence of controller inputs. The system includes a playback device configured to access the memory and select a selected section of the sequence of controller inputs corresponding to a time period, and output the selected section to a playback device in real time over a length of the time period.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for initializing a panoramic video, in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

Figure 1:
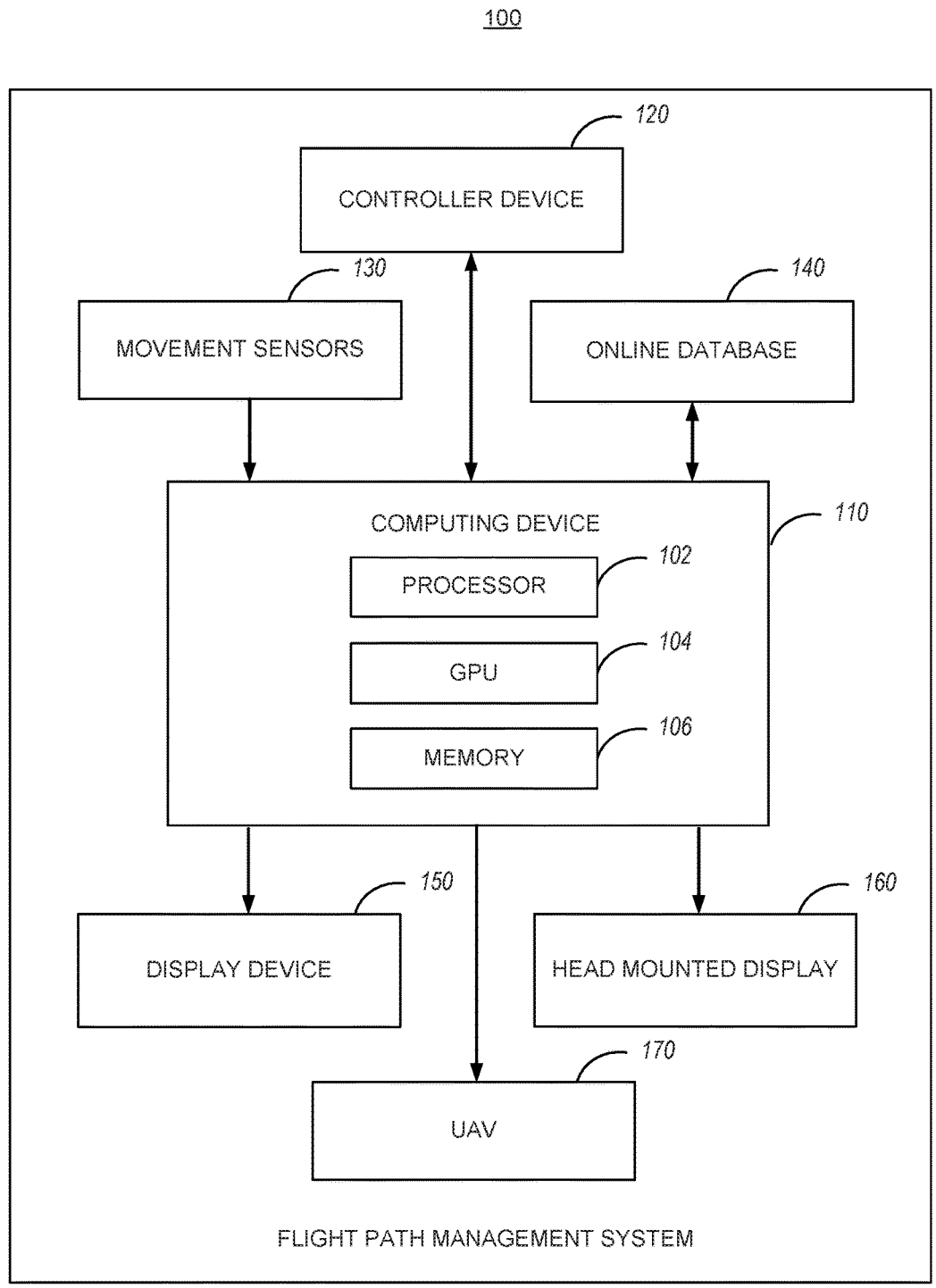
FIG. 1 illustrates a block diagram of an example flight path management system.

FIG. 1 illustrates a block diagram of an example flight path management system 100. The flight path management system 100 can include a computing device 110 connected to a controller device 120 and a playback device (e.g., a display device 150 and/or a head mounted display (HMD) 160). It is understood that the computing device 110 and one or more other components of the flight path management system 100 can be integrated into a single device or multiple connected devices.

The flight path management system 100 receives a sequence of controller inputs for a UAV 170. The controller inputs represent what a user flying the UAV inputs into a controller device to fly the UAV along a particular flight path and performing one or more aerial maneuvers. The sequence of controller inputs can for example be a sequence of controller actions along with timestamps. The sequence of controller inputs can be recorded at a set time interval, such as for example, every 0.1 seconds, 0.01, or 0.001 seconds. A shorter time interval gives a more accurate record of the controller inputs, but requires more storage and/or processing power.

In some implementations, the controller inputs is received from a controller device 120 that is used to control the UAV 170. The controller can include one or more analog or digital input options. Analog input options include flight stick or joystick controls, triggers, sliders, throttles, dials, etc. Digital input options include buttons, switches, etc. The sequence of controller inputs can for example include angles of positions of each joystick lever, slider position, and whether or not each button on the controller device is depressed, for each increment of time recorded.

In some implementations, the controller inputs are downloaded from an online database 140. The online database 140 can be a central repository where UAV pilots can upload their flight paths and maneuvers, represented by a sequence of controller inputs. The sequence of controller inputs can be organized into various categories for ease of retrieval. For example, various sequences of controller inputs used to fly a barrel roll can be placed in a barrel roll category, etc. In another example, various sequence of controller inputs used for a particular racing course can be placed in a category for that particular racing course.

In some implementations, the flight path management system 100 receives sensor data for the UAV, as it flies along a flight path and performs maneuvers, from one or more movement sensors 130. The movement sensors can include at least one of a camera, distance sensors, a Light Detection and Ranging sensor, or other such sensor. The computing device 110 determines controller inputs from the sensor data from the movement sensors by for example using a reverse engineering process. For example, the movement sensors 130 allows the computing device 110 to calculate the controller inputs required to move the UAV along the flight path and to perform the maneuvers based on the UAV's position, speed, and/or other sensed data.

The computing device 110 can be a personal computer, a laptop, a smart phone, tablet, a server, a mobile device, a game console system, or other such device. The computing device includes a processor 102, a graphics processing unit (GPU) 104, and a memory 106. It is understood that one or more of the processor 102, the GPU 104, or the memory 106 can be integrated into a single unit or as separate connected units.

The sequence of controller inputs is stored in the memory 106 of the computing device 110. The sequence of controller inputs is then accessed from the memory 106 by the processor 102. A user can select a selected section of the sequence of controller inputs that is of interest. For example, a user may only be interested in a flight path of a particular corner of a drone racing course and correspondingly select the selected section for that particular corner. In another example, the user is interested in the entire flight path of a race and thus the selected section is the entirety of the received sequence of controller inputs. The processor 102 accesses the memory 106 to access the selected section of the sequence of controller inputs.

The GPU 104 can output a graphical representation of the controller inputs. For example, a playback device can display a two-dimensional or three-dimensional virtual model representation of a controller device that mimics the looks and control movement of the physical controller device 120. For example, the playback device can display joystick levers, buttons, sliders, etc. on the virtual model move according to the controller inputs as the physical controller device 120 would move. This allows a user viewing the playback device to learn the proper controller inputs to cause the UAV 170 to move according to the flight path and perform the same maneuvers.

The GPU 104 can also or alternatively output a graphical representation of the UAV flight path corresponding to the selected section. For example, a playback device can display a trace of the flight path in a virtual space.

The GPU 104 can also or alternatively output a video playback of the UAV for the selected section in a first-person view, a third person view, or a static camera view. The user can watch and rewatch a graphical representation of the UAV fly the flight path corresponding to the selected section.

In some implementations, the playback device outputs the selected section of the sequence of controller inputs in real time, while the flight path management system 100 is concurrently receiving the sequence of controller inputs. For example, the sequence of controller inputs can be livestreamed to spectators connected to the flight path management system 100 over a wide area network (WAN) such as the Internet or over a local area network (LAN).

In some implementations, the playback device is a head-mounted display (HMD) such as a virtual reality HMD or an augmented reality (AR) HMD. The HMD allows a user of to adjust a camera viewing angle or position in a virtual space by moving or rotating his head in the physical space.

The flight path management system 100 can include a graphical user interface in for use with playback device to allow a user to adjust camera angles and positioning during playback of the UAV flying the received flight path. The GUI can include a virtual camera with pan (also referred to as yaw), tilt (also referred to as pitch), and zoom controls to select/change a camera view. The view selection interface allows the user to select the camera view for the playback, defined by view parameters, shown by the virtual camera. In some implementations, the user can adjust a camera view shown by a preview of a still image at the selected camera view. In some implementations, the user can drag a cursor's (e.g., with mouse, joystick, or touchscreen) position across a camera viewing plane to adjust/rotate (e.g., pan, tilt, or roll) a camera orientation of a panoramic video displayed by the playback device.

For example, selecting and dragging the cursor along the X and Y axis of a two-dimensional screen can rotate the camera orientation around the X and Y rotational axis in three-dimensional space. The graphical user interface can calculate the amount of rotation of the camera orientation based on a distance of travel of the mouse cursor in the two-dimensional screen. In some implementations, the user can zoom in or out of the camera view using at least one of keyboard, mouse, touchscreen, trackball, joystick, or other input device. In some implementations, the graphical user interface can include text boxes for a user to manually enter of the orientation by typing in Euler angles desired.

The graphical user interface creates a three-dimensional mesh representing a virtual world and places the virtual camera at the center of the three dimensional mesh. The selected camera view corresponds to a portion of a three-dimensional mesh space. For example, the three-dimensional mesh can be a sphere or a variety of other shapes depending on how the camera frames were stitched together. The shape is used by an algorithm to un-distort the stitched camera frame.

A mesh is a collection of vertices, edges and faces that defines the shape of a polyhedral object for use in three-dimensional modeling. The faces usually include triangles, quadrilaterals, or other simple convex polygons, but can also include more general concave polygons, or polygons with holes. A vertex is a position (usually in 3D space) along with other information such as color, normal vector and texture coordinates. An edge is a connection between two vertices. A face is a closed set of edges (e.g., a triangle face has tree edges and a quad face has four edges).

Polygon meshes may be represented in a variety of ways, using different methods to store the vertex, edge and face data. Examples of polygon mesh representations include Face-vertex meshes, Winged-edge meshes, Half-edge meshes, Quad-edge meshes, Corner-table meshes, and Vertex-vertex meshes.

The graphical user interface uses a graphics pipeline or rendering pipeline to create a two-dimensional representation of a three-dimensional scene using the three-dimensional mesh.

Figure 2:
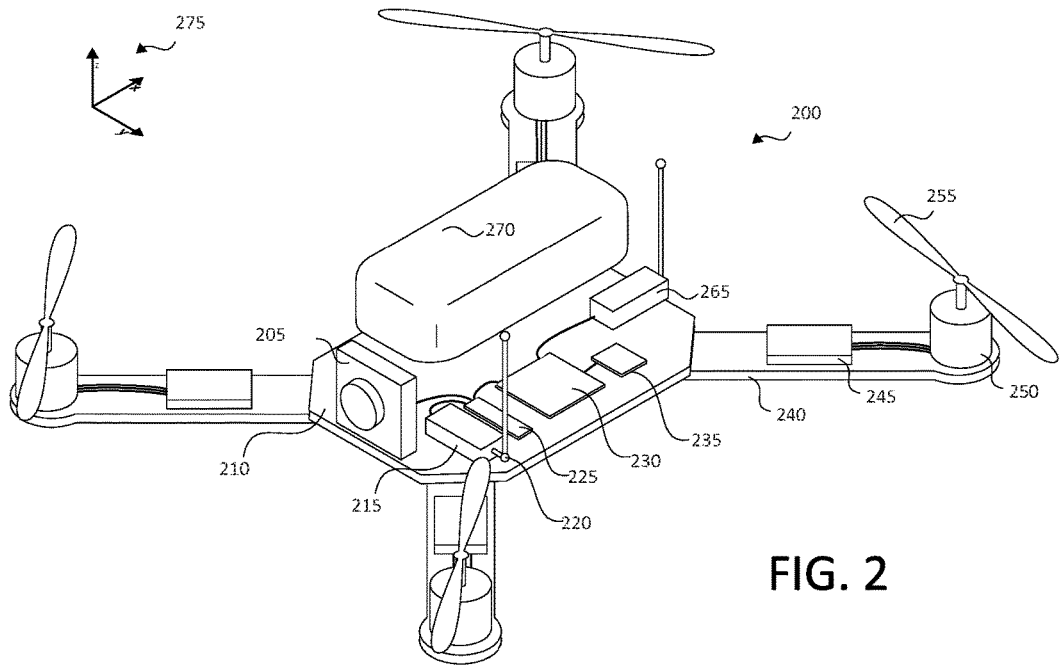
FIG. 2 illustrates an example unmanned aerial vehicle (UAV)

FIG. 2 shows unmanned aerial vehicle (UAV) 200 according to some embodiments. UAV 200 can have one or more motors 250 configured to rotate attached propellers 255 in order to control the position of UAV 200 in the air. UAV 200 can be configured as a fixed wing vehicle (e.g., airplane), a rotary vehicle (e.g., a helicopter or multirotor), or a blend of the two. For the purpose of FIG. 2, axes 275 can assist in the description of certain features. If UAV 200 is oriented parallel to the ground, the Z axis can be the axis perpendicular to the ground, the X axis can generally be the axis that passes through the bow and stern of UAV 200, and the Y axis can be the axis that pass through the port and starboard sides of UAV 200. Axes 275 are merely provided for convenience of the description herein.

In some embodiments, UAV 200 has main body 210 with one or more arms 240. The proximal end of arm 240 can attach to main body 210 while the distal end of arm 240 can secure motor 250. Arms 240 can be secured to main body 210 in an "X" configuration, an "H" configuration, a "T" configuration, or any other configuration as appropriate. The number of motors 250 can vary, for example there can be three motors 250 (e.g., a "tricopter"), four motors 250 (e.g., a "quadcopter"), eight motors (e.g., an "octocopter"), etc.

In some embodiments, each motor 255 rotates (i.e., the drive shaft of motor 255 spins) about parallel axes. For example, the thrust provided by all propellers 255 can be in the Z direction. Alternatively, a motor 255 can rotate about an axis that is perpendicular (or any angle that is not parallel) to the axis of rotation of another motor 255. For example, two motors 255 can be oriented to provide thrust in the Z direction (e.g., to be used in takeoff and landing) while two motors 255 can be oriented to provide thrust in the X direction (e.g., for normal flight). In some embodiments, UAV 200 can dynamically adjust the orientation of one or more of its motors 250 for vectored thrust.

In some embodiments, the rotation of motors 250 can be configured to create or minimize gyroscopic forces. For example, if there are an even number of motors 250, then half of the motors can be configured to rotate counter-clockwise while the other half can be configured to rotate clockwise. Alternating the placement of clockwise and counter-clockwise motors can increase stability and enable UAV 200 to rotate about the z-axis by providing more power to one set of motors 250 (e.g., those that rotate clockwise) while providing less power to the remaining motors (e.g., those that rotate counter-clockwise).

Motors 250 can be any combination of electric motors, internal combustion engines, turbines, rockets, etc. In some embodiments, a single motor 250 can drive multiple thrust components (e.g., propellers 255) on different parts of UAV 200 using chains, cables, gear assemblies, hydraulics, tubing (e.g., to guide an exhaust stream used for thrust), etc. to transfer the power.

In some embodiments, motor 250 is a brushless motor and can be connected to electronic speed controller 245. Electronic speed controller 245 can determine the orientation of magnets attached to a drive shaft within motor 250 and, based on the orientation, power electromagnets within motor 250. For example, electronic speed controller 245 can have three wires connected to motor 250, and electronic speed controller 245 can provide three phases of power to the electromagnets to spin the drive shaft in motor 250. Electronic speed controller 245 can determine the orientation of the drive shaft based on back-emf on the wires or by directly sensing to position of the drive shaft.

Transceiver 265 can receive control signals from a control unit (e.g., a handheld control transmitter, a server, etc.). Transceiver 265 can receive the control signals directly from the control unit or through a network (e.g., a satellite, cellular, mesh, etc.). The control signals can be encrypted. In some embodiments, the control signals include multiple channels of data (e.g., "pitch," "yaw," "roll," "throttle," and auxiliary channels). The channels can be encoded using pulse-width-modulation or can be digital signals. In some embodiments, the control signals are received over TC/IP or similar networking stack.

In some embodiments, transceiver 265 can also transmit data to a control unit. Transceiver 265 can communicate with the control unit using lasers, light, ultrasonic, infra-red, Bluetooth, 802.11x, or similar communication methods, including a combination of methods. Transceiver can communicate with multiple control units at a time.

Position sensor 235 can include an inertial measurement unit for determining the acceleration and/or the angular rate of UAV 200, a GPS receiver for determining the geolocation and altitude of UAV 200, a magnetometer for determining the surrounding magnetic fields of UAV 200 (for informing the heading and orientation of UAV 200), a barometer for determining the altitude of UAV 200, etc. Position sensor 235 can include a land-speed sensor, an air-speed sensor, a celestial navigation sensor, etc.

UAV 200 can have one or more environmental awareness sensors. These sensors can use sonar, LiDAR, stereoscopic imaging, computer vision, etc. to detect obstacles and determine the nearby environment. For example, a collision avoidance system can use environmental awareness sensors to determine how far away an obstacle is and, if necessary, change course.

Position sensor 235 and environmental awareness sensors can all be one unit or a collection of units. In some embodiments, some features of position sensor 235 and/or the environmental awareness sensors are embedded within flight controller 230.

In some embodiments, an environmental awareness system can take inputs from position sensors 235, environmental awareness sensors, databases (e.g., a predefined mapping of a region) to determine the location of UAV 200, obstacles, and pathways. In some embodiments, this environmental awareness system is located entirely on UAV 200, alternatively, some data processing can be performed external to UAV 200.

Camera 205 can include an image sensor (e.g., a CCD sensor, a CMOS sensor, etc.), a lens system, a processor, etc. The lens system can include multiple movable lenses that can be adjusted to manipulate the focal length and/or field of view (i.e., zoom) of the lens system. In some embodiments, camera 205 is part of a camera system which includes multiple cameras 205. For example, two cameras 205 can be used for stereoscopic imaging (e.g., for first person video, augmented reality, etc.). Another example includes one camera 205 that is optimized for detecting hue and saturation information and a second camera 205 that is optimized for detecting intensity information. In some embodiments, camera 205 optimized for low latency is used for control systems while a camera 205 optimized for quality is used for recording a video (e.g., a cinematic video). Camera 205 can be a visual light camera, an infrared camera, a depth camera, etc.

A gimbal and dampeners can help stabilize camera 205 and remove erratic rotations and translations of UAV 200. For example, a three-axis gimbal can have three stepper motors that are positioned based on a gyroscope reading in order to prevent erratic spinning and/or keep camera 205 level with the ground.

Video processor 225 can process a video signal from camera 205. For example video process 225 can enhance the image of the video signal, down-sample or up-sample the resolution of the video signal, add audio (captured by a microphone) to the video signal, overlay information (e.g., flight data from flight controller 230 and/or position sensor), convert the signal between forms or formats, etc.

Video transmitter 220 can receive a video signal from video processor 225 and transmit it using an attached antenna. The antenna can be a cloverleaf antenna or a linear antenna. In some embodiments, video transmitter 220 uses a different frequency or band than transceiver 265. In some embodiments, video transmitter 220 and transceiver 265 are part of a single transceiver.

Battery 270 can supply power to the components of UAV 200. A battery elimination circuit can convert the voltage from battery 270 to a desired voltage (e.g., convert 12 v from battery 270 to 5 v for flight controller 230). A battery elimination circuit can also filter the power in order to minimize noise in the power lines (e.g., to prevent interference in transceiver 265 and transceiver 220). Electronic speed controller 245 can contain a battery elimination circuit. For example, battery 270 can supply 12 volts to electronic speed controller 245 which can then provide 5 volts to flight controller 230. In some embodiments, a power distribution board can allow each electronic speed controller (and other devices) to connect directly to the battery.

In some embodiments, battery 270 is a multi-cell (e.g., 2S, 3S, 4S, etc.) lithium polymer battery. Battery 270 can also be a lithium-ion, lead-acid, nickel-cadmium, or alkaline battery. Other battery types and variants can be used as known in the art. Additional or alternative to battery 270, other energy sources can be used. For example, UAV 200 can use solar panels, wireless power transfer, a tethered power cable (e.g., from a ground station or another UAV 200), etc. In some embodiments, the other energy source can be utilized to charge battery 270 while in flight or on the ground.

Battery 270 can be securely mounted to main body 210. Alternatively, battery 270 can have a release mechanism. In some embodiments, battery 270 can be automatically replaced. For example, UAV 200 can land on a docking station and the docking station can automatically remove a discharged battery 270 and insert a charged battery 270. In some embodiments, UAV 200 can pass through docking station and replace battery 270 without stopping.

Battery 270 can include a temperature sensor for overload prevention. For example, when charging, the rate of charge can be thermally limited (the rate will decrease if the temperature exceeds a certain threshold). Similarly, the power delivery at electronic speed controllers 245 can be thermally limited—providing less power when the temperature exceeds a certain threshold. Battery 270 can include a charging and voltage protection circuit to safely charge battery 270 and prevent its voltage from going above or below a certain range.

UAV 200 can include a location transponder. For example, in a racing environment, race officials can track UAV 200 using location transponder. The actual location (e.g., X, Y, and Z) can be tracked using triangulation of the transponder. In some embodiments, gates or sensors in a track can determine if the location transponder has passed by or through the sensor or gate.

Flight controller 230 can communicate with electronic speed controller 245, battery 270, transceiver 265, video processor 225, position sensor 235, and/or any other component of UAV 200. In some embodiments, flight controller 230 can receive various inputs (including historical data) and calculate current flight characteristics. Flight characteristics can include an actual or predicted position, orientation, velocity, angular momentum, acceleration, battery capacity, temperature, etc. of UAV 200. Flight controller 230 can then take the control signals from transceiver 265 and calculate target flight characteristics. For example, target flight characteristics might include "rotate×degrees" or "go to this GPS location". Flight controller 230 can calculate response characteristics of UAV 200. Response characteristics can include how electronic speed controller 245, motor 250, propeller 255, etc. respond, or are expected to respond, to control signals from flight controller 230. Response characteristics can include an expectation for how UAV 200 as a system will respond to control signals from flight controller 230. For example, response characteristics can include a determination that one motor 250 is slightly weaker than other motors.

After calculating current flight characteristics, target flight characteristics, and response characteristics flight controller 230 can calculate optimized control signals to achieve the target flight characteristics. Various control systems can be implemented during these calculations. For example a proportional-integral-derivative (PID) can be used. In some embodiments, an open-loop control system (i.e., one that ignores current flight characteristics) can be used. In some embodiments, some of the functions of flight controller 230 are performed by a system external to UAV 200. For example, current flight characteristics can be sent to a server that returns the optimized control signals. Flight controller 230 can send the optimized control signals to electronic speed controllers 245 to control UAV 200.

In some embodiments, UAV 200 has various outputs that are not part of the flight control system. For example, UAV 200 can have a loudspeaker for communicating with people or other UAVs 200. Similarly, UAV 200 can have a flashlight or laser. The laser can be used to "tag" another UAV 200.

Figure 3:
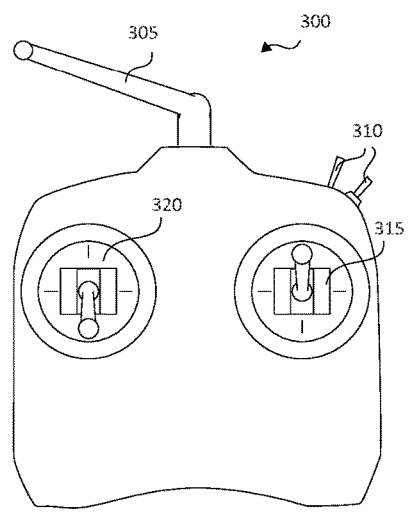
FIG. 3 illustrates an example controller device.

FIG. 3 shows control transmitter 300 according to some embodiments. Control transmitter 300 can send control signals to transceiver 265. Control transmitter can have auxiliary switches 310, joysticks 315 and 320, and antenna 305. Joystick 315 can be configured to send elevator and aileron control signals while joystick 320 can be configured to send throttle and rudder control signals (this is termed a mode 2 configuration). Alternatively, joystick 315 can be configured to send throttle and aileron control signals while joystick 320 can be configured to send elevator and rudder control signals (this is termed a mode 1 configuration). Auxiliary switches 310 can be configured to set options on control transmitter 300 or UAV 200. In some embodiments, control transmitter 300 receives information from a transceiver on UAV 200. For example, it can receive some current flight characteristics from UAV 200.

Figure 4:
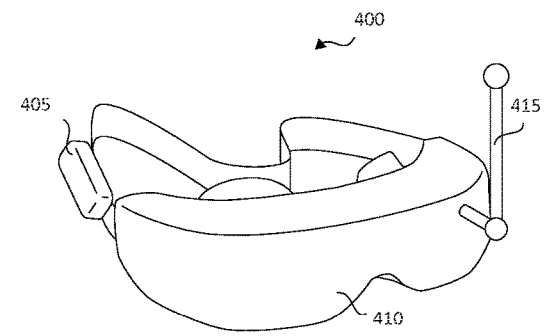
FIG. 4 illustrates an example head-mounted display (HMD)

FIG. 4 shows display 400 according to some embodiments. Display 400 can include battery 405 or another power source, display screen 410, and receiver 415. Display 400 can receive a video stream from transmitter 220 from UAV 200. Display 400 can be a head-mounted unit as depicted in FIG. 4. Display 400 can be a monitor such that multiple viewers can view a single screen. In some embodiments, display screen 410 includes two screens, one for each eye; these screens can have separate signals for stereoscopic viewing. In some embodiments, receiver 415 is mounted on display 4100 (as should in FIG. 4), alternatively, receiver 415 can be a separate unit that is connected using a wire to display 400. In some embodiments, display 400 is mounted on control transmitter 300.

Figure 5:
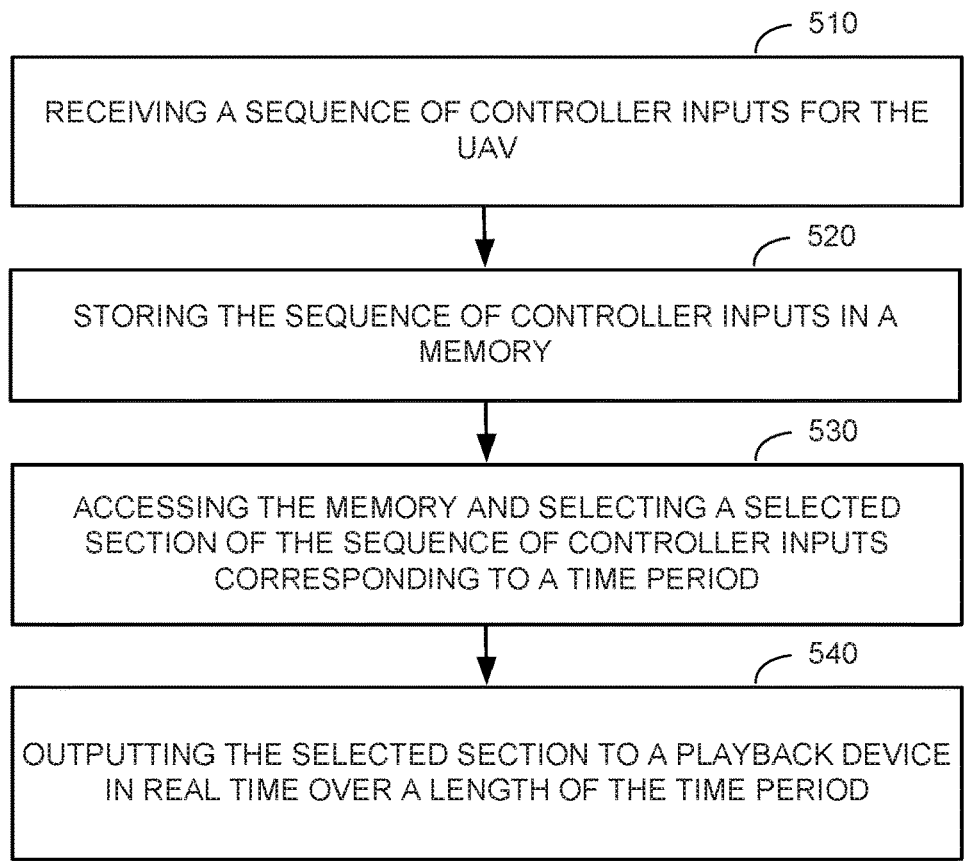
FIG. 5 illustrates an example methodology for managing flight paths for an unmanned aerial vehicle (UAV)

FIG. 5 illustrates an example methodology 500 for managing flight paths for an unmanned aerial vehicle (UAV), by a flight path management system. At step 510, the flight path management system receives a sequence of controller inputs for the UAV. In some implementations, receiving controller inputs comprises recording controller inputs from a controller device. In some implementations, receiving controller inputs comprises retrieving a saved flight path from an online database.

In some implementations, the flight path management system senses movement of the UAV, by at least one sensor, and determines controller inputs that correspond to the movement of the UAV.

At step 520, the flight path management system stores the sequence of controller inputs in a memory.

At step 530, the flight path management system accesses the memory and selects a selected section of the sequence of controller inputs corresponding to a time period.

At step 540, the flight path management system outputs the selected section to a playback device in real time over a length of the time period. In some implementations, the playback device is a self-piloting UAV and outputting comprises controlling the UAV to fly according to the selected section of the sequence of controller inputs. In some implementations, outputting comprises displaying a graphical representation of controller inputs, corresponding to the selected section, on a virtual model of a controller device. In some implementations, outputting comprises displaying a first-person view playback of the UAV, corresponding to the selected section, on the playback device. In some implementations, outputting comprises displaying a third-person view playback of the UAV, corresponding to the selected section, on the playback device. In some implementations, outputting comprises displaying a trace of a flight path of the UAV, corresponding to the selected section, on the playback device. In some implementations, the playback device comprises a head-mounted display (HMD). In some implementations, outputting the selected section occurs concurrently with the receiving the sequence of controller inputs.

In some implementations, the flight path management system moves of one or more levers of a flight stick, wherein controller inputs corresponding to the moving matches the selected section of the sequence of controller inputs, and wherein the playback device is the flight stick.

Figure 6:
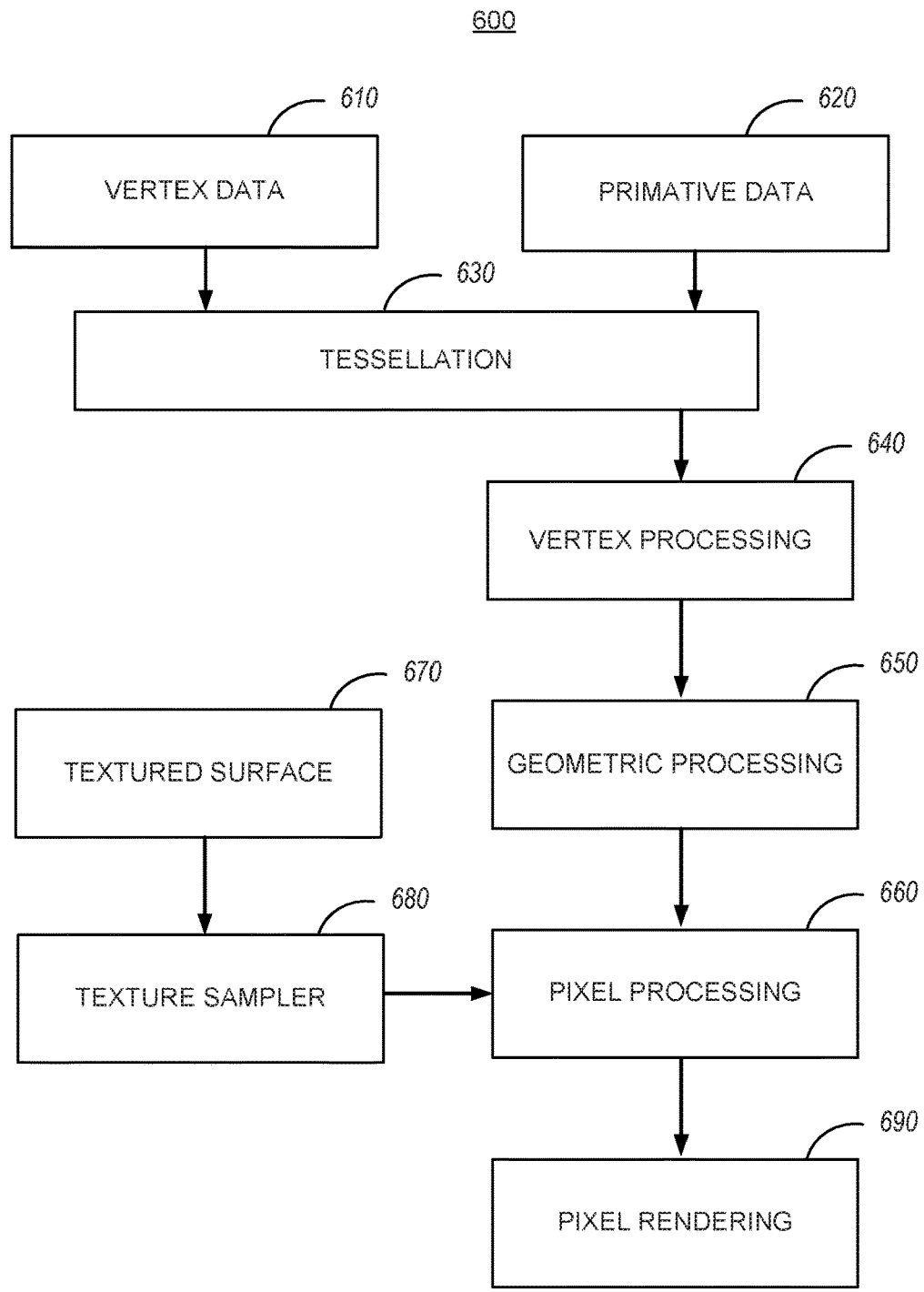
FIG. 6 illustrates a flow diagram of an example graphics pipeline in the prior art.

FIG. 6 illustrates a flow diagram 600 of an example graphics pipeline in the prior art. The graphical user interface uses a graphics pipeline or rendering pipeline to create a two-dimensional representation of a three-dimensional scene. For example, OpenGL and DirectX are two of the most commonly used graphics pipelines.

Stages of the graphics pipeline include creating a scene out of geometric primitives (i.e., simple geometric objects such as points or straight line segments). Traditionally this is done using triangles, which are particularly well suited to this as they always exist on a single plane. The graphics pipeline transforms form a local coordinate system to a three-dimensional world coordinate system. A model of an object in abstract is placed in the coordinate system of the three-dimensional world. Then the graphics pipeline transforms the three-dimensional world coordinate system into a three-dimensional camera coordinate system, with the camera as the origin.

The graphics pipeline then creates lighting, illuminating according to lighting and reflectance. The graphics pipeline then performs projection transformation to transform the three-dimensional world coordinates into a two-dimensional view of a two-dimensional camera. In the case of a perspective projection, objects which are distant from the camera are made smaller. Geometric primitives that now fall completely outside of the viewing frustum will not be visible and are discarded.

Next the graphics pipe performs rasterization. Rasterization is the process by which the two-dimensional image space representation of the scene is converted into raster format and the correct resulting pixel values are determined. From now on, operations will be carried out on each single pixel. This stage is rather complex, involving multiple steps often referred as a group under the name of pixel pipeline.

In some implementations, the graphical user interface performs projecting and rasterizing based on the virtual camera. For example, each pixel in the image can be determined during the rasterizing to create the two-dimensional image. This two-dimensional image can then be displayed.

Lastly, the graphics pipeline assigns individual fragments (or pre-pixels) a color based on values interpolated from the vertices during rasterization, from a texture in memory, or from a shader program. A shader program calculates appropriate levels of color within an image, produce special effects, and perform video post-processing. Shader programs calculate rendering effects on graphics hardware with a high degree of flexibility. Most shader programs use a graphics processing unit (GPU).

When a stitched together camera frame is mapped over the three-dimensional mesh, the graphics pipeline can interpolate between vertexes of the mesh. The number of vertices of the mesh is a factor in how well an image can be rendered. A higher number of vertices can provide a better image rendering, but can be more time consuming to render by computer hardware. Each vertex can represented as a three dimensional coordinate with and X, Y and Z parameter.

Interpolation is the filling in of frames between the key frames. It typically calculates the in between frames through use of (usually) piecewise polynomial interpolation to draw images semi-automatically. Interpolation gives the appearance that a first frame evolves smoothly into a second frame.

In the example graphics pipeline show in FIG. 6, at step 610 untransformed model vertices are stored in vertex memory buffers. At step 620 geometric primitives, including points, lines, triangles, and polygons, are referenced in the vertex data with index buffers. At step 630, tessellation converts higher-order primitives, displacement maps, and mesh patches to vertex locations and stores those locations in vertex buffers. At step 640, transformations are applied to vertices stored in the vertex buffer. At step 650, clipping, back face culling, attribute evaluation, and rasterization are applied to the transformed vertices. At step 660, Pixel shader operations use geometry data to modify input vertex and texture data, yielding output pixel color values. At step 670, texture coordinates are supplied. At step 680 texture level-of-detail filtering is applied to input texture values. At step 690 final rendering processes modify pixel color values with alpha, depth, or stencil testing, or by applying alpha blending or fog.

Figure 7:
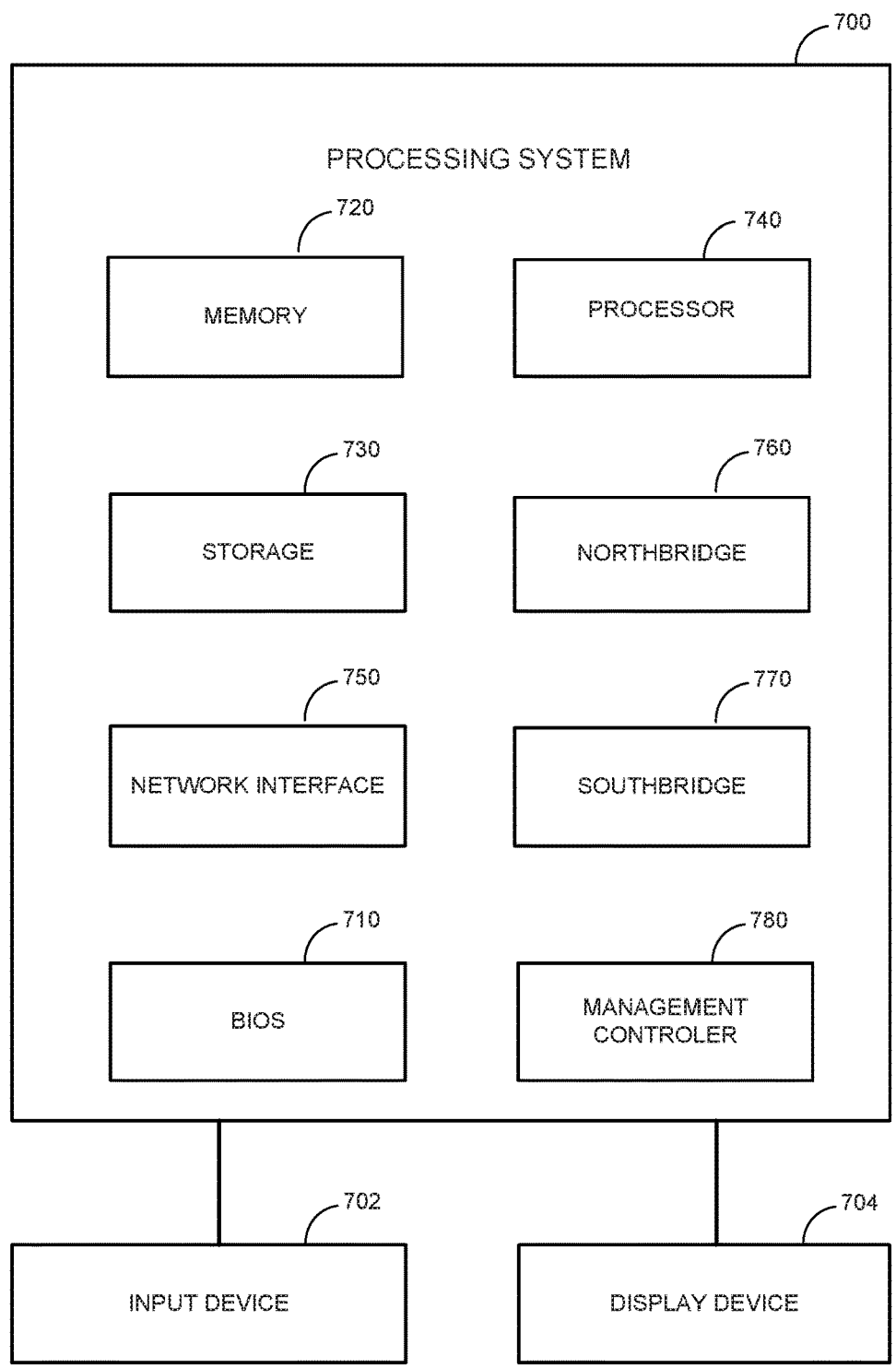
FIG. 7 illustrates a block diagram of an example computer system.

FIG. 7 illustrates a block diagram of an example processing system 700. The processing system 700 can include a processor 740, a network interface 750, a management controller 780, a memory 720, a storage 730, a Basic Input/Output System (BIOS) 710, and a northbridge 760, and a southbridge 770.

The processing system 700 can be, for example, a server (e.g., one of many rack servers in a data center) or a personal computer. The processor (e.g., central processing unit (CPU)) 740 can be a chip on a motherboard that can retrieve and execute programming instructions stored in the memory 720. The processor 740 can be a single CPU with a single processing core, a single CPU with multiple processing cores, or multiple CPUs. One or more buses (not shown) can transmit instructions and application data between various computer components such as the processor 740, memory 720, storage 730, and networking interface 750.

The memory 720 can include any physical device used to temporarily or permanently store data or programs, such as various forms of random-access memory (RAM). The storage 730 can include any physical device for non-volatile data storage such as a HDD or a flash drive. The storage 730 can have a greater capacity than the memory 720 and can be more economical per unit of storage, but can also have slower transfer rates.

The BIOS 710 can include a Basic Input/Output System or its successors or equivalents, such as an Extensible Firmware Interface (EFI) or Unified Extensible Firmware Interface (UEFI). The BIOS 710 can include a BIOS chip located on a motherboard of the processing system 700 storing a BIOS software program. The BIOS 710 can store firmware executed when the computer system is first powered on along with a set of configurations specified for the BIOS 710. The BIOS firmware and BIOS configurations can be stored in a non-volatile memory (e.g., NVRAM) 712 or a ROM such as flash memory. Flash memory is a non-volatile computer storage medium that can be electronically erased and reprogrammed.

The BIOS 710 can be loaded and executed as a sequence program each time the processing system 700 is started. The BIOS 710 can recognize, initialize, and test hardware present in a given computing system based on the set of configurations. The BIOS 710 can perform self-test, such as a Power-on-Self-Test (POST), on the processing system 700. This self-test can test functionality of various hardware components such as hard disk drives, optical reading devices, cooling devices, memory modules, expansion cards and the like. The BIOS can address and allocate an area in the memory 720 in to store an operating system. The BIOS 710 can then give control of the computer system to the OS.

The BIOS 710 of the processing system 700 can include a BIOS configuration that defines how the BIOS 710 controls various hardware components in the processing system 700. The BIOS configuration can determine the order in which the various hardware components in the processing system 700 are started. The BIOS 710 can provide an interface (e.g., BIOS setup utility) that allows a variety of different parameters to be set, which can be different from parameters in a BIOS default configuration. For example, a user (e.g., an administrator) can use the BIOS 710 to specify dock and bus speeds, specify what peripherals are attached to the computer system, specify monitoring of health (e.g., fan speeds and CPU temperature limits), and specify a variety of other parameters that affect overall performance and power usage of the computer system.

The management controller 780 can be a specialized microcontroller embedded on the motherboard of the computer system. For example, the management controller 780 can be a BMC or a RMC. The management controller 780 can manage the interface between system management software and platform hardware. Different types of sensors built into the computer system can report to the management controller 780 on parameters such as temperature, cooling fan speeds, power status, operating system status, etc. The management controller 780 can monitor the sensors and have the ability to send alerts to an administrator via the network interface 750 if any of the parameters do not stay within preset limits, indicating a potential failure of the system. The administrator can also remotely communicate with the management controller 780 to take some corrective action such as resetting or power cycling the system to restore functionality.

The northbridge 760 can be a chip on the motherboard that can be directly connected to the processor 740 or can be integrated into the processor 740. In some instances, the northbridge 760 and the southbridge 770 can be combined into a single die. The northbridge 760 and the southbridge 770, manage communications between the processor 740 and other parts of the motherboard. The northbridge 760 can manage tasks that require higher performance than the southbridge 770. The northbridge 760 can manage communications between the processor 740, the memory 720, and video controllers (not shown). In some instances, the northbridge 760 can include a video controller.

The southbridge 770 can be a chip on the motherboard connected to the northbridge 760, but unlike the northbridge 760, is not directly connected to the processor 740. The southbridge 770 can manage input/output functions (e.g., audio functions, BIOS, Universal Serial Bus (USB), Serial Advanced Technology Attachment (SATA), Peripheral Component Interconnect (PCI) bus, PCI eXtended (PCI-X) bus, PCI Express bus, Industry Standard Architecture (ISA) bus, Serial Peripheral Interface (SPI) bus, Enhanced Serial Peripheral Interface (eSPI) bus, System Management Bus (SMBus), etc.) of the processing system 700. The southbridge 770 can be connected to or can include within the southbridge 770 the management controller 770, Direct Memory Access (DMAs) controllers, Programmable Interrupt Controllers (PICs), and a real-time clock.

The input device 702 can be at least one of a game controller, a joystick, a mouse, a keyboard, a touchscreen, a trackpad, or other similar control device. The input device 702 allows a user to provide input data to the processing system 700.

The display device 704 can be at least one of a monitor, a light-emitting display (LED) screen, a liquid crystal display (LCD) screen, a head mounted display (HMD), a virtual reality (VR) display, a augmented reality (AR) display, or other such output device. The display device 704 allows the processing system 700 to output visual information to a user.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A method for managing flight paths for an unmanned aerial vehicle (UAV) by a flight path management system, the method comprising:
   receiving a sequence of controller inputs at a recording device, the received sequence of controller inputs associated with controlling a flight path of the UAV;
   storing the sequence of controller inputs in a memory associated with the recording device, the sequence of controller inputs stored in association with the flight path;
   receiving a selection of a portion of the flight path at a user interface associated with a playback device, the portion corresponding to a time period within a duration of the flight path;
   identifying a section of the sequence of controller inputs corresponding to the time period within the duration of the flight path based on execution of instructions by a processor associated with the playback device; and
   outputting a graphical representation of the identified section of the sequence of controller inputs to the playback device in real time over a length of the time period.

2. The method of claim 1, further comprising recording the controller inputs received from a controller device at the recording device.

3. The method of claim 1, wherein receiving the sequence of controller inputs comprises retrieving a saved flight path from an online database.

4. The method of claim 1, further comprising:
   sensing movement of the UAV via at least one sensor; and
   identifying the sequence of controller inputs that correspond to the movement of the UAV via the processor.

5. The method of claim 1, wherein the playback device is a self-piloting UAV, and further outputting control instructions executable by the self-piloting UAV to fly according to the identified section of the sequence of controller inputs.

6. The method of claim 1, wherein outputting the graphical representation further comprises displaying the graphical representation of the identified section of the sequence of controller inputs on a virtual model of a controller device.

7. The method of claim 1, wherein the playback device includes a flight stick, and wherein the identified section of the sequence of controller inputs comprises one or more lever movements of the flight stick.

8. The method of claim 1, wherein the graphical representation further comprises a first-person view playback of the UAV corresponding to the identified section of the sequence of controller inputs as displayed on the playback device.

9. The method of claim 1, wherein the graphical representation further comprises a third-person view playback of the UAV corresponding to the identified section of the sequence of controller inputs as displayed on the playback device.

10. The method of claim 1, wherein outputting the graphical representation further comprises a trace of the flight path of the UAV corresponding to the identified section of the sequence of controller inputs as displayed on the playback device.

11. The method of claim 1, wherein the playback device comprises a head-mounted display (HMD).

12. The method of claim 1, wherein outputting the graphical representation of the identified section occurs concurrently with receiving the sequence of controller inputs.

13. A system for managing flight paths by an unmanned aerial vehicle (UAV), the system comprising:
- a recording device that receives a sequence of controller inputs associated with controlling a flight path of the UAV;
- a memory coupled to the recording device that stores the sequence of controller inputs in association with the flight path; and
- a playback device configured to:
  - access the memory and select an identified section of the sequence of controller inputs corresponding to a time period within a duration of the flight path based on a received selection of a portion of the flight path, the portion corresponding to the time period within a duration of the flight path; and
  - output a graphical representation of the identified section of the sequence of controller inputs to a playback device in real time over a length of the time period.

14. The system of claim 13 further comprising at least one sensor that senses movement of the UAV; and a processor that executes instructions stored in memory to identify the sequence of controller inputs that corresponds to the movement of the UAV.

15. The system of claim 13, wherein the playback device is a self-piloting UAV that further outputs control instructions executable by the self-piloting UAV to fly according to the identified section of the sequence of controller inputs.

16. The system of claim 13 wherein the playback device outputs the graphical representation by displaying the graphical representation of the identified section of the sequence of controller inputs on a virtual model of a controller device.

17. The system of claim 13, wherein the playback device includes a flight stick, and wherein the identified section of the sequence of controller inputs comprises one or more lever movements of the flight stick.

18. The system of claim 13, wherein the playback device outputs the graphical representation by displaying a first-person view playback of the UAV corresponding to the identified section of the sequence of controller inputs as displayed on the playback device.

19. The system of claim 13 wherein the playback device outputs the graphical representation by displaying a third-person view playback of the UAV corresponding to the identified section of the sequence of controller inputs as displayed on the playback device.

20. The system of claim 13 wherein the playback device outputs the graphical representation by displaying a trace of the flight path of the UAV corresponding to the identified section of the sequence of controller inputs as displayed on the playback device.

* * * * *